May 30, 1950      E. H. WORTHINGTON      2,509,949
CROSSTIE CONNECTION BETWEEN LAWN MOWER SIDE FRAMES
Filed Aug. 18, 1948
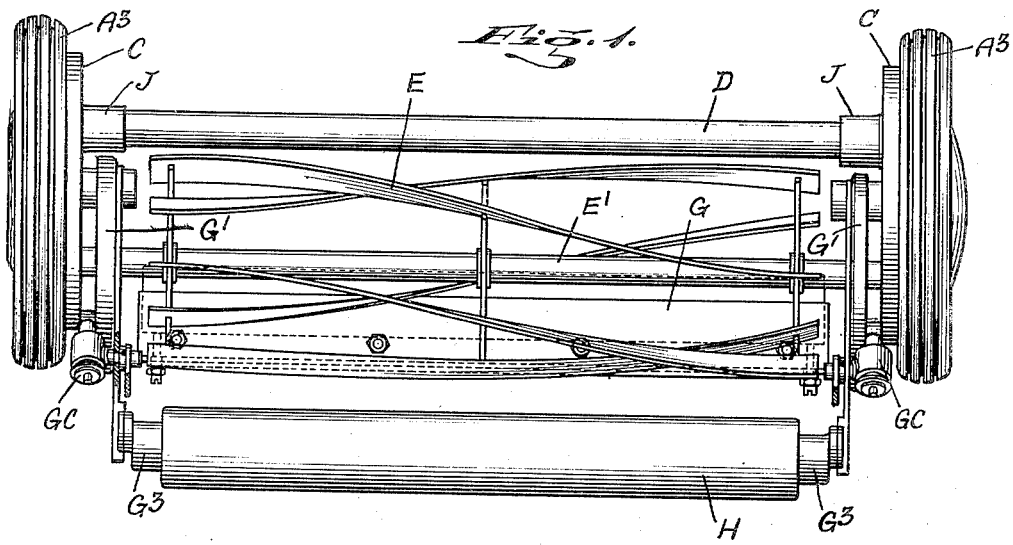
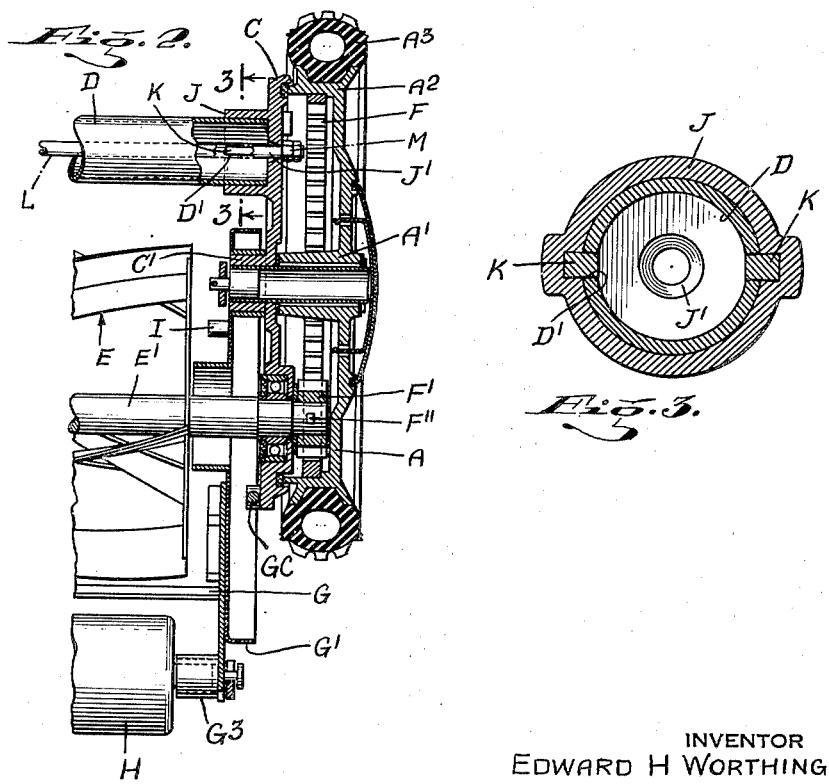
INVENTOR
EDWARD H WORTHINGTON
BY
John E. Hubbell
ATTORNEY Patented May 30, 1950

2,509,949

UNITED STATES PATENT OFFICE 2,509,949

CROSSTIE CONNECTION BETWEEN LAWN MOWER SIDE FRAMES

Edward H. Worthington, East Stroudsburg, Pa.

Application August 18, 1948, Serial No. 44,816

1 Claim. (Cl. 56—249)

The present invention relates to lawnmowers of the well known type comprising side frame members connected by a cross tie which extends between and is connected at its ends to two side frame members, and is intended to unite with the latter in forming a rigid lawnmower framework supported by rotatable ground engaging elements and in which the grass cutting element or elements are mounted. Lawnmowers of the above mentioned general type and of various designs and forms have long been in extensive use in this country. In all such lawnmowers heretofore used, of which I have knowledge, however, the cross-tie connection between the side frames has been open to one or more of the following objections, namely, that it is too expensive to construct; that it is too heavy and complicated; and that its connection with the side frames lacks adequate strength and/or rigidity.

The general object of the present invention is to provide an improved cross-tie connection between the side frames of a lawnmower of the general type above mentioned. More specifically, the object of the invention is to provide a simple, light weight and relatively inexpensive cross-tie connection between the side frame uniting with the latter to form a lawnmower framework of suitable strength and rigidity. The present invention is characterized by the construction of the side frame members as castings each with an elongated socket facing and in alignment with the socket of the other, and snugly receiving the corresponding end of a tubular cross-tie member, the cylindrical socket walls and tubular cross-tie member being formed with interlocking shoulders positively preventing the rotation of the parts in the assembled framework. In the preferred form of the invention, a tie rod having threaded ends extends axially through the tubular member and through openings formed for the purpose in the end walls of the sockets, so that the tie bolt may be put under tension by nuts threaded on the ends of the tie rod to thereby rigidly clamp each end of the tubular member in the corresponding side frame socket.

The various features of novelty which characterize my invention are pointed out with particularity in the claim annexed to and forming a part of this specification. For a better understanding of the invention, however, its advantages, and specific objects attained with its use, reference should be had to the accompanying drawing and descriptive matter in which I have illustrated and described a preferred embodiment of the invention.

Of the drawings:

Fig. 1 is a plan view of a lawnmower;

Fig. 2 is a plan view on an enlarged scale of a portion of the lawnmower shown in Fig. 1, with parts shown in horizontal sections; and Fig. 3 is a section on the line 3—3 of Fig. 2.

In the drawings I have illustrated a preferred form of the present invention embodied in a lawnmower of the general type above mentioned, and which is similar in its general design to the lawnmower disclosed in my prior Patent 2,253,924 of August 26, 1941, reissued as Patent No. 22,845. As shown in Fig. 1, the lawnmower comprises main ground engaging wheels A, each of which has a hub portion A' and a rim portion $A^2$ connected to the hub portion by a dished, disc-like body portion. The wheel rim is channeled to receive a pneumatic or other cushion or yielding tire $A^3$, such as is now quite commonly used on hand lawnmower wheels. Each wheel A is journalled on the hub-like portion C' of an adjacent side frame member C alongside the wheel. The two side frame members C at the opposite sides of the lawnmower are rigidly connected, as hereinafter described, to the ends of a cross-tie member D. A fly knife or rotatable cutter element E, shown as comprising the usual spiral cutting blades, has each end of its shaft E' journalled in the corresponding side frame member C.

Each side frame member C and the wheel A alongside it, cooperate to form a gear chamber enclosing gearing of customary type through which the rotation of each wheel A in the direction in which it rotates in the normal forward movement of the lawnmower over the ground, will rotate the cutter E, even when the other wheel A is not in rotation. As shown, the gearing through which each wheel A is gear connected to the fly knife comprises an annular internal gear F anchored against the inner wall of the rim portion $A^2$ of the wheel. The teeth of the internal gear F are in mesh with the teeth of a small pinion F' mounted on the corresponding end of the cutter shaft E'. Each pinion F' is connected to the corresponding end of the shaft E' by a conventional one-way clutch shown as comprising a sliding pawl F'' mounted in a guideway extending through the shaft E'. The clutch connection of each pinion F' to the shaft E', is provided for the customary purposes of permitting the shaft to turn freely in the pinion when the adjacent wheel A is not, and the wheel A at the opposite side of the lawn mower is, rotating in the forward direction.

The two frame members C are also connected by means comprising a bed knife G and bed knife frame members G' to which the opposite ends of the bed knife G are rigidly connected. Each of the frame members G' is pivoted on the corresponding hub portion C' of the adjacent side frame C. By means of suitable adjusting devices FG which may be of well known type, each bed knife frame part G' may be given the small angular adjustments about the hub portion C' of the corresponding side frame member C, required to maintain the desired contact between the bed knife G and the blades of the cutter E. Such adjusting devices may advantageously be of the type disclosed and claimed in my said prior Patent No. 22,845, reissued February 18, 1947, but form no part of the invention claimed herein, and need not be illustrated or further described herein. Each bed knife member G' is provided with a bearing $G^3$ for the corresponding trunnion end of a ground roller H. The lawnmower framework is provided with a trunnion or pivot I at each side of the lawnmower for pivotal connection to the bifurcations at the corresponding end of the usual (not shown) handle by which the lawnmower may be moved and guided in its movements over the ground, as is customary in the operation of a conventional hand lawnmower.

In accordance with the present invention, the cross-tie member D is a metal tube having each end snugly received in a socket or hollow boss J, formed integrally with the cast side frame member C. Advantageously, the side frame member C is a die casting, and the wall of the socket in which the corresponding end of the tubular cross-tie is received, may be made with as great axial length and thickness as is needed, without adding significantly to the weight or to the production cost of the lawnmower.

In the preferred construction shown, inserts K are incorporated in the peripheral wall of the socket J in the die casting operation. Each insert K may be in the form of a steel bar parallel to the axis of the socket and tapered in cross section with its inner edge of greater width than its outer edge. A portion of each insert of a thickness equal to, or a little greater than the wall thickness of the tubular element D, is received in, and fits tightly in a corresponding longitudinal slot D' in the adjacent end of the tubular member D. As shown, there are two diametrically opposed keys K and associated slots D', and a rod L extending axially through the tube D' and through central holes J' formed in the bottom walls of the sockets J, into the gear chamber of the side frame members C. One end, at least, and preferably each end of the rod L is threaded and preferably has a clamping nut M and associated locking nut screwed thereon. By tightening up those nuts, the rod L may be put under tension to clamp the ends of the tubular member D in the sockets J with sufficient pressure between its end surfaces and the transverse bottom walls of the socket J against which said end surface abuts, to maintain the lawn mower framework suitably rigid. In a desirable practical form of the invention embodied in a lawn mower having a fly knife about twenty inches long, the tube member D may be 1½ to 1¾ inches in diameter with a wall thickness of $\frac{1}{16}$ of an inch. The depth of each socket J is about 1 inch, and the end edge surfaces of the member D are accurately faced and the bottom wall socket surfaces are accurately formed to insure parallelism of the side frame members C when the lawn mower is assembled and the nuts on the rod L are tightened to obtain suitable contact pressure between the bottom walls of the sockets and the abutting end surfaces of the member D. Each of the ribs K received in the slots D' of the member D may be about ¼ of an inch wide so that each of the two arcuate end surfaces of the member M at the opposite sides of the axis of the member are more than 2¼ inches long. With the relatively large bearing surfaces of the member D and the walls of the sockets J, the tilting of the member D relative to either side frame member as a result of the ordinary stresses incident to lawn mower operation is prevented and the desired parallelism of the side frame members is thereby maintained.

As will be apparent to those skilled in the art from the foregoing description, the described cross-tie connection is relatively cheap to construct and light in weight, and is adapted to provide ample strength and rigidity to the lawn mower framework of which it forms a part. Although in the lawn mower shown, as in other conventional lawn mowers, the rear ground engaging roller and the cutting mechanism parts form relatively strong connections between the lawn mower side frame members, the last mentioned connections are not of themselves effective to prevent the small movements of the side frame members out of parallelism with one another which the member D and its end connections to the side frame members are adapted to prevent.

While in accordance with the provisions of the statutes, I have illustrated and described the best form of embodiment of my invention now known to me, it will be apparent to those skilled in the art that changes may be made in the form of the apparatus disclosed without departing from the spirit of my invention as set forth in the appended claim, and that in some cases certain features of my invention may be used to advantage without a corresponding use of other features.

Having now described my invention, what I claim as new and desire to secure by Letters Patent, is:

In a lawn mower of the type comprising metal side frame members pivotally connected to ground engaging wheels and grass cutting means mounted in said side frames, the improvement comprising an integral portion of each side frame member shaped to form the cylindrical wall of an elongated socket with a transverse bottom wall and having its axis in alignment with the axis of the socket having its cylindrical wall formed by a portion of the other side frame member, said sockets being open at their adjacent ends and having transverse bottom walls and a bolt hole in the bottom wall of each socket, one or more longitudinally extending ribs rigidly connected to and extending inwardly from the surrounding wall of each socket, a one piece tubular cross-tie member of circular cross-section extending between said side frames and having each end received in the corresponding socket and of an external diameter to fit snugly therein and formed with an individual slot for and snugly receiving each of said ribs whereby said tubular member is held against rotative movement in the sockets, said cross-tie member also having portions of its end surfaces distributed about said axis in abutting engagement with the transverse end wall of said sockets with end surfaces parallel to and abutting against arc shaped portions of the bottom walls of said sockets, and a tie rod extending through the tubular tie member and through the holes in the end walls of the socket, and threaded end connection means to said rod through which the latter may be put under tension to maintain said abutting engagement between each side frame member and the adjacent end surface of said tubular member.

EDWARD H. WORTHINGTON.

REFERENCES CITED

The following references are of record in the file of this patent:

UNITED STATES PATENTS

| Number | Name | Date |
|---|---|---|
| 1,826,663 | Hessenbruch | Oct. 6, 1931 |
| 2,266,165 | Clemson | Dec. 16, 1941 |